United States Patent [19]

Desmonds et al. Best Available Copy

[11] 3,906,459

[45] Sept. 16, 1975

[54] BINARY DATA MANIPULATION NETWORK HAVING MULTIPLE FUNCTION CAPABILITY FOR COMPUTERS

[75] Inventors: Daniel J. Desmonds, Roseville; Donald P. Tate; Douglas A. Robbins, both of St. Paul, all of Minn.

[73] Assignee: Control Data Corporation, Minneapolis, Minn.

[22] Filed: June 3, 1974

[21] Appl. No.: 475,533

[52] U.S. Cl. .............................................. 340/172.5

[51] Int. Cl.$^2$ .............................................. G06F 13/00

[58] Field of Search .............................................. 445/1

[56] References Cited

UNITED STATES PATENTS

| | | | |
|---|---|---|---|
| 3,343,138 | 9/1967 | Ulrich | 340/172.5 |
| 3,370,274 | 2/1968 | Kettley et al. | 340/172.5 |
| 3,387,278 | 6/1968 | Pasternak | 340/172.5 |
| 3,430,202 | 2/1969 | Downing et al. | 340/172.5 |

*Primary Examiner*—R. Stephen Dildine, Jr.
*Attorney, Agent, or Firm*—William J. McGinnis, Jr.

[57] ABSTRACT

The present invention is a binary data manipulation network comprising a pair of mask generation networks in a configuration which controls a merge network to allow a first operand to be manipulated by insertion of selected bits from a second operand at a selected position. Each mask generation network produces a result operand consisting of a group of binary ones adjacent to a group of binary zeroes where the break point between ones and zeroes is determined by an input count operand. The two mask generation networks are connected to the merge network in end for end fashion so that, typically, the merge network gates the bits of the first operand as the result operand when the mask generation network result operands are dissimilar and gates the bits of the second operand when the bits of the mask generation network result operands are similar. The apparatus of the present invention also performs other related operations using the network configuration disclosed.

9 Claims, 15 Drawing Figures

FIG. 4

THIS CHART DEFINES THE CONTROL (C) TERMS SHOWN ON FIGURE 1 INPUTS.

| | C01 | C02 | C03 | C04 | C06 | C07 | C08 | C10 | C11 | C12 | C13 | C14 |
|---|---|---|---|---|---|---|---|---|---|---|---|---|
| RIGHT SHIFT A BY M PLACES CIRCULAR | X | X | 1 | 0 | 0 | 0 | 0 | X | X | 0 | 1 | 0 |
| RIGHT SHIFT A BY M PLACES WITH EXTENSION | X | X | 1 | 0 | 1 | 0 | 0 | X | * | 0 | 1 | 0 |
| LEFT SHIFT A BY M PLACES CIRCULAR | 1 | 0 | 0 | 1 | 0 | 0 | 0 | X | X | 0 | 1 | X |
| LEFT SHIFT A BY M PLACES WITH ZERO EXTENSION | 1 | 0 | 0 | 1 | 0 | 0 | 1 | 0 | X | 0 | 1 | 0 |
| INSERT THE RIGHTMOST M BITS OF A INTO B BEGINNING AT BIT POSITION N | 0 | 1 | 1 | 0 | 1 | 1 | 0 | 0 | 0 | 1 | X | 1 |
| EXTRACT M BITS FROM A BEGINNING AT BIT N. PLACE THESE M BITS RIGHT JUSTIFIED INTO B | 1 | 1 | 0 | 1 | 0 | 0 | 1 | 1 | X | 0 | 0 | 0 |

* SET C11 EQUAL TO THE SIGN TO BE EXTENDED.
X IMPLIES A DON'T CARE CONDITION

LEGEND REFERS TO A AND B OPERANDS AND M AND N COUNT OPERANDS

BINARY DATA MANIPULATION NETWORK HAVING MULTIPLE FUNCTION CAPABILITY FOR COMPUTERS

BACKGROUND OF THE INVENTION

The present invention relates to digital computers and more particularly an apparatus which may be used in a pipeline digital computer.

In addition to arithmetic operations, general purpose digital computers are required to perform various manipulative operations on data. Such operations may include shifting by a certain number of positions, deleting certain bits from an operand, inserting bits from one operand into another and so on. One part of such manipulation is the generation of a masking pattern to define the bits of the input operand which are to be singled out for the selected manipulation operation. The masking pattern is used to control gates for the individual bits of the operand.

The generation of a masking pattern has always been a time consuming and expensive operation in the digital computer. This operation has typically been performed by placing a single binary 1 in a shift network and extending the binary 1 by shifting it an appropriate number of positions. A shift network requires several times the logic of the mask generation network described in this invention. Also, when a pipeline operation is desired, it is preferable to minimize the number of logic steps in a sequence of operations, as well as make the operation take the same time for all operands in the sequence.

In order to perform the operations of this invention, the use of two uniques masking networks is required together with a circular shift network and merge network. Extract and insert operations have typically required multiple passes through a shift network, whereas the present invention requires a single pass. Multiple passes make pipeline computation either expensive or inefficient since if an operation requires N passes through a shift network there must be N shift networks or the throughput rate must be reduced by a factor of (1/N). It is also clear that if more operations can be performed by a single network, there is a cost advantage to the combination of functions in a network where the components are used in different ways depending on the function to be performed.

SUMMARY OF THE INVENTION

The present invention is a data manipulation network which can perform six separate functions or operations on a stream of data consisting of a plurality of individual operands. Of course the invention is applicable to individual operations on single operands. The six operations are: (1) right shift operand A by count operand M places circular, (2) right shift operand A by count operand M places with sign extension, (3) left shift operand A by count operand M places circular, (4) left shift operand A by count operand M places with zero extension, (5) insert the rightmost count operand M bits of operand A into operand B at bit position designated by count operand N, and (6) extract count operand M bits from operand A beginning at bit position designated by count operand N and placing these bits right justified into operand B. Obviously, these operations sometimes require one operand for manipulation and other times two operands. For each operation at least one, and sometimes two, count operands must be provided to describe the operation to be performed. Also various additional instruction or control signals must be provided to set or control the condition of gates within the networks of the invention to be described. All such data operands, count operands and instruction or control signals are to be provided by a central processor of which the present invention is a part in response to operator programmed instructions relating to the operations desired.

The six specific operations may more particularly be described as follows. Right shifting operand A by M places in a circular mode is a reasonably well understood operation in computer terminology. Each bit of binary operand A is shifted right M places or bit positions. The bits that are shifted off the right end of the register holding the operand are brought around and re-inserted into the left-hand end of the register as if all bits in the operand were ordered in a circle, hence, the term circular right shift. For example, in a computer for handling operands having 64 bits, it is as though there is a 64 bit register where there is a connection between energy bit and the bit to the immediate right thereof with the right-most bit of the register connected back around to the left-most bit of the register. In such a register the number contained therein is shifted right, using the abovedescribed connections.

A right shift of operand A with sign extension means that the operand is shifted right but the bits removed from the right-hand end of the register are not re-inserted into the left-hand end of the register. A predetermined sign for the operand, either a logical or binary one or a logical zero is positioned at the left end of the register with the bits in the register taking the value of the sign in subsequent bit positions where the operand has been removed by shifting. If an operand is to be shifted to the right eight positions, with sign extension, then copies of the sign bit will appear in the left-most eight bits of the result operand.

A circular left shift is similar to a circular right shift except the operand moves left in the register.

A left shift with zero extension is very similar to a right shift with sign extension except that the operand shifts left and rather than inserting sign bits on the left-hand end of the number logical zeroes are inserted on the right-hand end of the result operand. A shift left by 10 places with zero extension produces 10 zeros on the right-hand end of the result operand after the shift.

An insert operation is more complicated. The right-most M bits of an operand A are inserted into an operand B beginning at bit position N. The bit numbering convention used in this application is that the left-most bit of an operand is numbered zero. In a 64 bit operand, the left-most bit in that operand is bit zero, the right-most bit in the operand is bit 63. To illustrate an insert operation, take as an example the M count operand equal to 5 and the N count operand equal to 10. If M is 5, the right-most five bits of operand A are placed in B beginning at bit position 10. Thus, bits 10, 11, 12, 13 and 14 in operand B at the end of the operation are the same as the right-most five bits of operand A, that is of bits 59, 60, 61, 62 and 63 of operand A.

The extract operation is the inverse of the insert operation. M bits are extracted from operand A beginning at bit position N and then the values of these M bits are right justified into operand B. Right justified means that the bits are placed as far to the right in B as possible without losing any bits. For example, to extract five bits from operand A beginning at bit position 10, take bits 10, 11, 12, 13 and 14 from operand A and place these five bits in bit positions 59, 60, 61, 62 and 63 of operand B.

The binary data manipulation network of the present invention is comprised of a merge network which generates the resultant operand from inputs received from two special mask networks, a right circular shift network containing the shifted A operand, and a B operand holding register together with appropriate control signals for operating the gates in the merge network. The mask generation networks generate mask patterns from count operands which are operated on separately, or in some cases added together. Various selection networks are also constituted in the circuit to control the flow of operands and count operands in the network. Control signals are shown as being provided externally to the circuit, but may be provided by means as simple as a twelve bit instruction register into which an instruction is entered setting the bits of the register equal to the binary values of the control signals derived therefrom. Of course, a central processor can provide six instruction operands as well as the other required operands for the system.

BRIEF DESCRIPTION OF THE DRAWINGS

FIG. 4 is a chart showing the instruction control signal conditions for control inputs shown on FIG. 1 for the functions performed by the present invention.

DESCRIPTION OF THE PREFERRED EMBODIMENT

Figure 1:
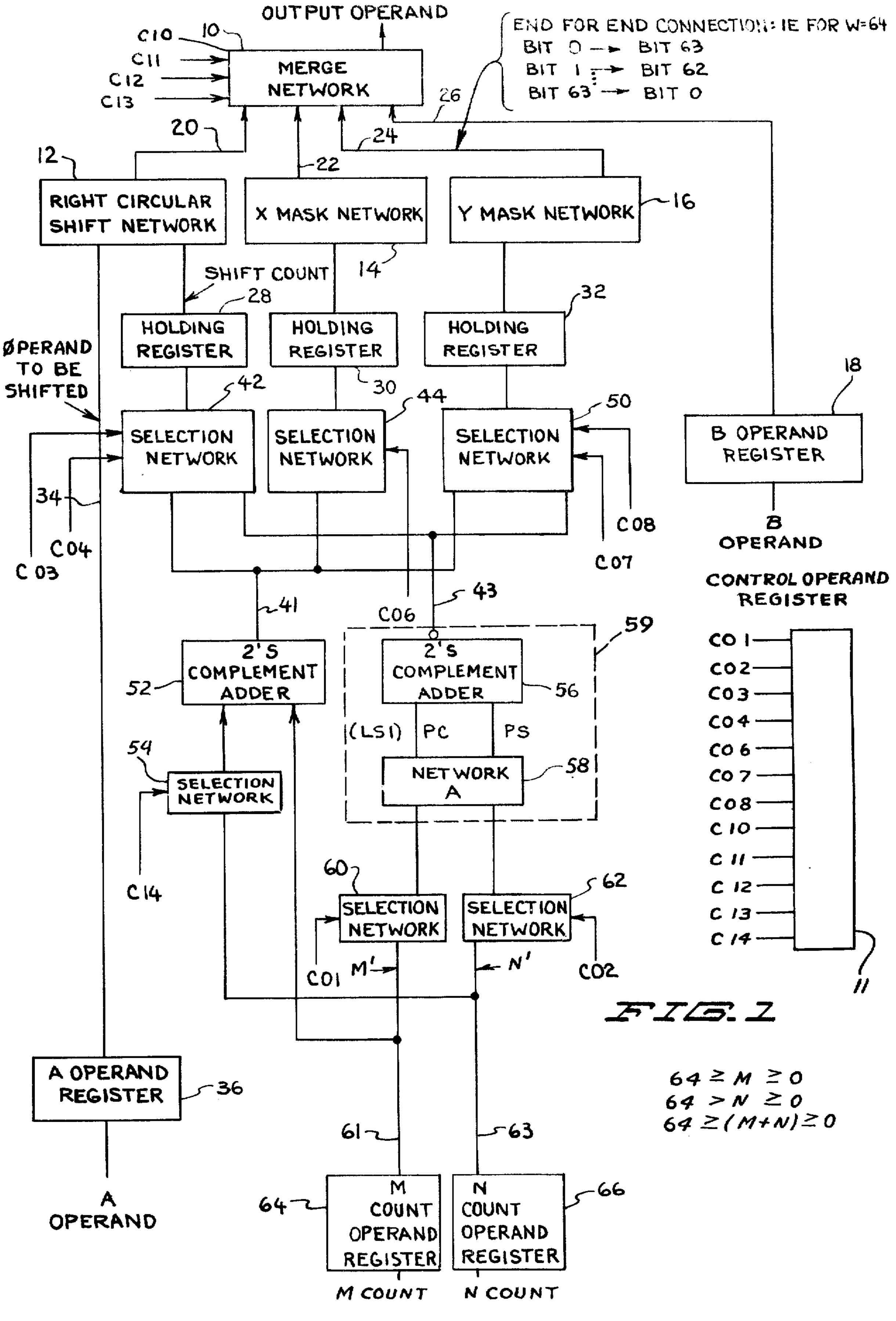
FIG. 1 is a block diagram of an embodiment of the present invention.

Referring now to FIG. 1, the figure is substantially selfexplanatory. Output operands are produced by merge network 10 which is connected with and has as input operands the outputs from right circular shift network 12, a first or X mask network 14, a second or Y mask network 16 and a B operand holding register 18. These four devices are connected to merge network 10 by data trunks 20, 22, 24 and 26, respectively.

Right circular shift network 12 receives its input operand through data trunk 34 from A operand holding register 36. Right circular shift network 12 receives its shift count input from holding register 28 which in turn is connected to selection network 42. Similarly, mask network 14 receives its input from holding register 30 which in turn is connected to selection network 44. Also, mask network 16 receives its input from holding register 32 which in turn is connected to selection network 50.

It should be noted that merge network 10 and selection networks 42, 44 and 50 each have various input lines designated CO3, CO4, etc. These are the control signal input terms which are defined in FIG. 4 for the selected operations to be performed by the invention. The logic effect of these signals may be ascertained by examining FIGS. 2 and 3A through 3G. Control operand register 11 provides these signals.

Selection networks 42, 44 and 50 each have available as an input by way of data trunks 41 and 43 the output of 2's complement adders 52 and 56, respectively. Adder 52 receives as inputs the M count operand on data trunk 61 and the N count operand, when gated by selection network 54, from data trunk 63. Data trunks 61 and 63 receive inputs from the M count operand holding register 64 and the N count operand holding register 66, respectively. Data trunks 61 and 63 also supply inputs to selection networks 60 and 62, respectively. Selection networks 60 and 62 are connected to network A 58 which in turn is connected to adder 56. The combination of network A58 and adder 56 is an adder or summation device 59.

Still referring to FIG. 1, the present invention includes a number of holding registers, such as holding registers 18, 28, 30, 32, 36, 64 and 66 which may be used in timing operands through the system in pipeline fashion. Data is manipulated between these holding registers by selection networks 42, 44, 50, 54, 60 and 62. A detailed showing of the selection networks is shown in FIGS. 3B, 3C, 3D, 3E, 3F and 3G, where the figures show the configuration for a single typical bit which is repeated for each bit of operand handled.

FIG. 4 describes the values for various control constants or signals used in these selection networks. As has been noted, this invention can perform six basic data manipulation operations which are necessary in a high speed digital computer. Using FIG. 4, values can be assigned to each of the control constants required for operation of the invention. An X on FIG. 4 indicates that the control signal may be any value for the operation that is being performed, since the gate controlled thereby is not involved in the operation. Thus, the signal may be either a one or a zero. A one indicates that this control constant is a binary one when an operation is performed. A zero indicates that the control constant is a binary zero when the operation is performed. An asterisk indicates that the control constant ought to be set equal to the sign that is extended into the output.

FIG. 1 shows two two's complement adders 52 and 56. These adders are conventional two's complement addition networks. It should be noted that the NOT output of two's complement adder 56 is used as indicated by the small circular symbol leading to data trunk 43. The NOT output means that the ones complement of the normal output of this adder is used.

Figure 3A:
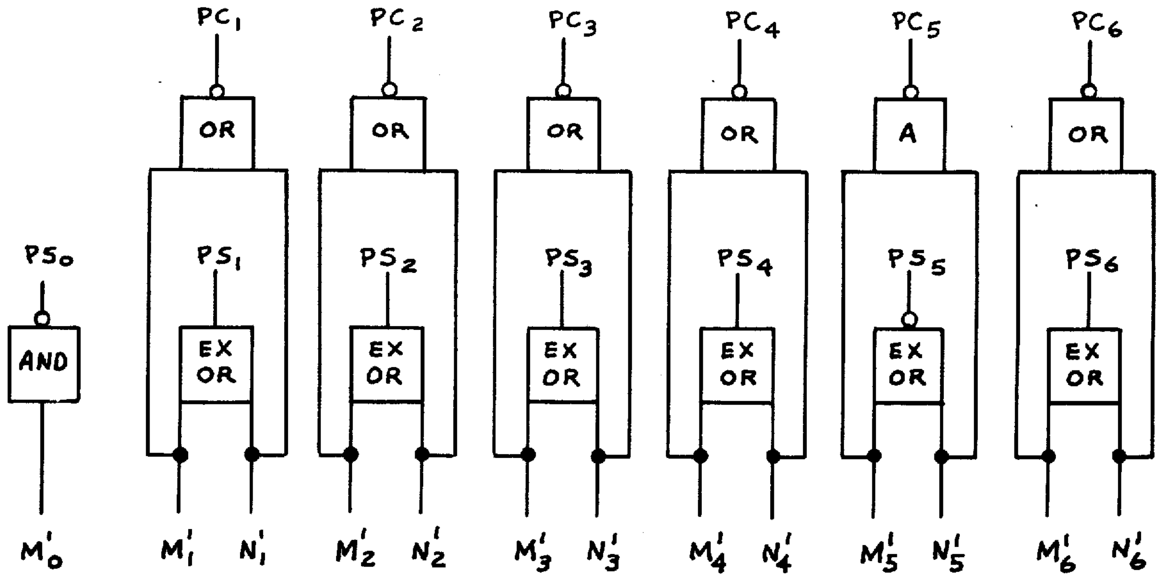
FIG. 3A is a detailed diagram showing the logic elements of network A represented in block 58 of FIG. 1.
Figure 3B:
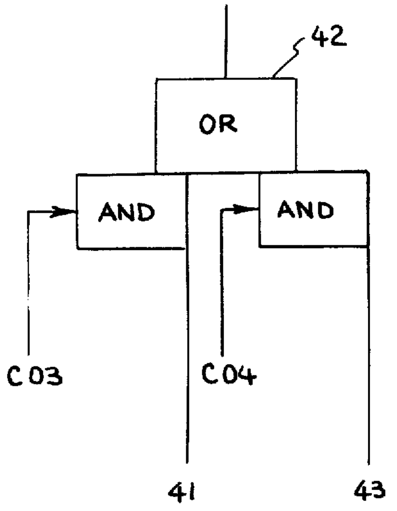
FIG. 3B is a detailed diagram showing the logic elements of the selection network represented in block 42 of FIG. 1 for a typical bit where the logic is repeated for each bit handled by the network.
Figure 3C:
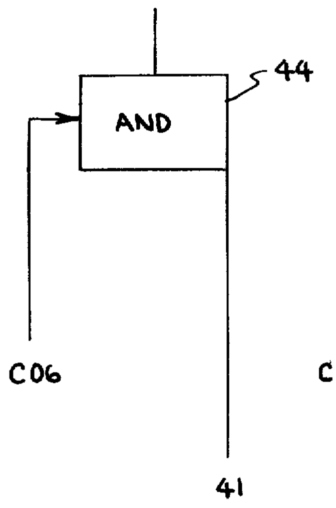
FIG. 3C is a detailed diagram showing the logic elements of the selection network represented in block 44 of FIG. 1 for a typical bit where the logic is repeated for each bit handled by the network.
Figure 3D:
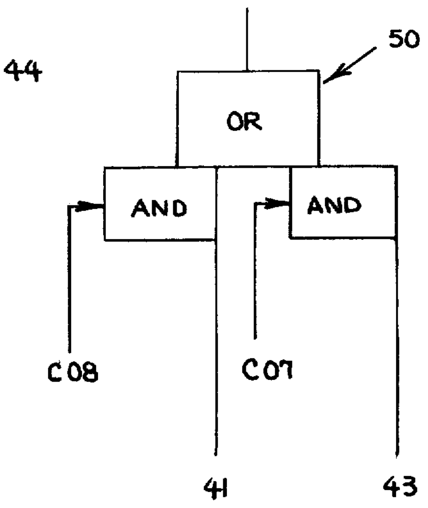
FIG. 3D is a detailed diagram showing the logic elements of the selection network represented in block 50 of FIG. 1 for a typical bit where the logic is repeated for each bit handled by the network.
Figure 3E:
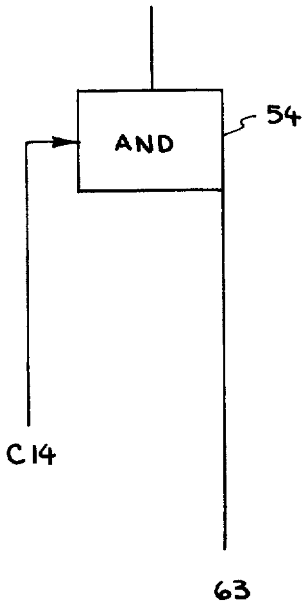
FIG. 3E is a detailed diagram showing the logic elements of the network represented in block 54 of FIG. 1 for a typical bit where the logic is repeated for each bit handled by the network.
Figure 3F:
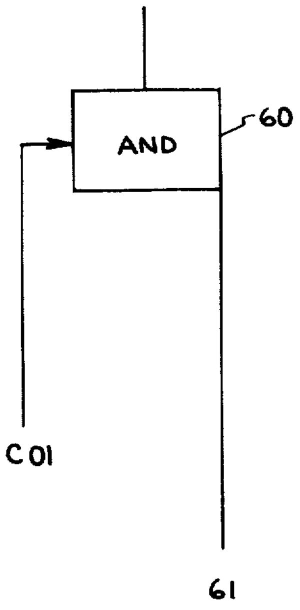
FIG. 3F is a detailed diagram showing the logic elements of the selection network represented in block 60 of FIG. 1 for a typical bit where the logic is repeated for each bit handled by the network.
Figure 3G:
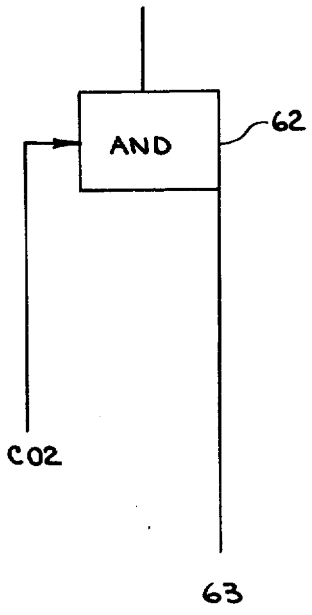
FIG. 3G is a detailed diagram showing the logic elements of the selection network represented in block 62 of FIG. 1 for a typical bit where the logic is repeated for each bit handled by the network.
Figure 5A:
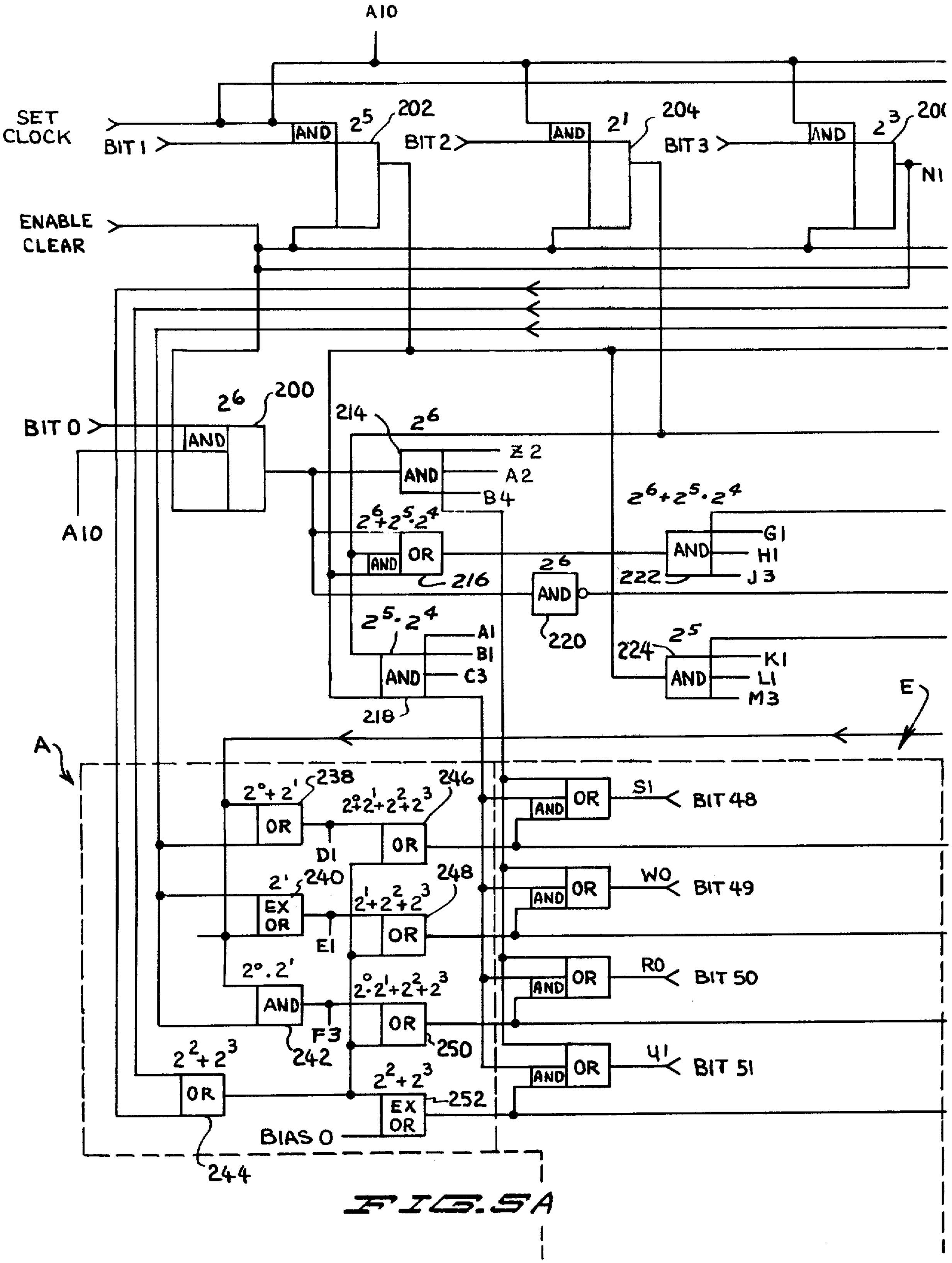
FIG. 5A is a part of a detailed logic diagram showing the logic elements contained in one implementation of a mask network such as shown in either block 14 or 16 in FIG. 1.
Figure 5B:
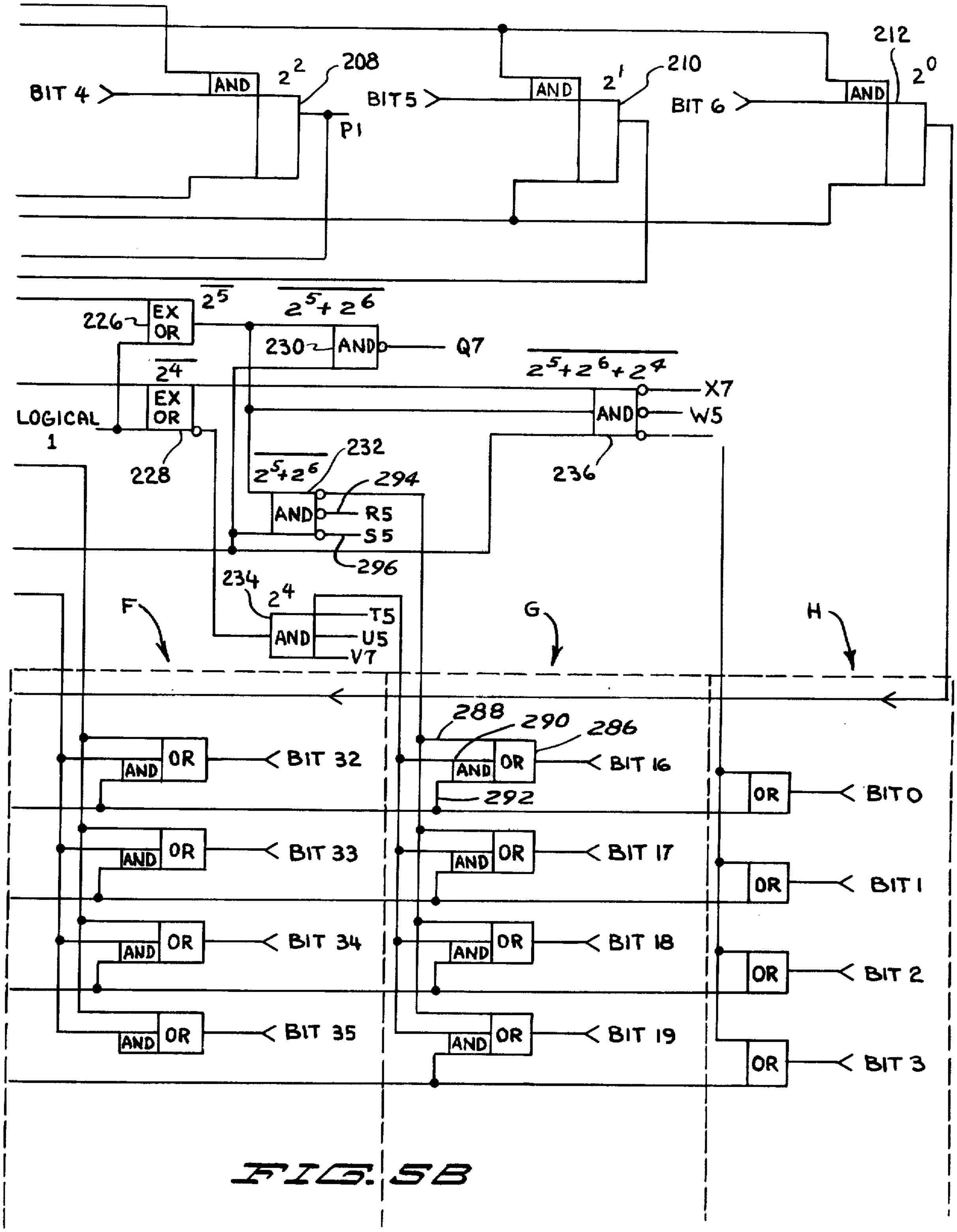
FIG. 5B is another part of the diagram partially shown in FIG. 5A.
Figure 6A:
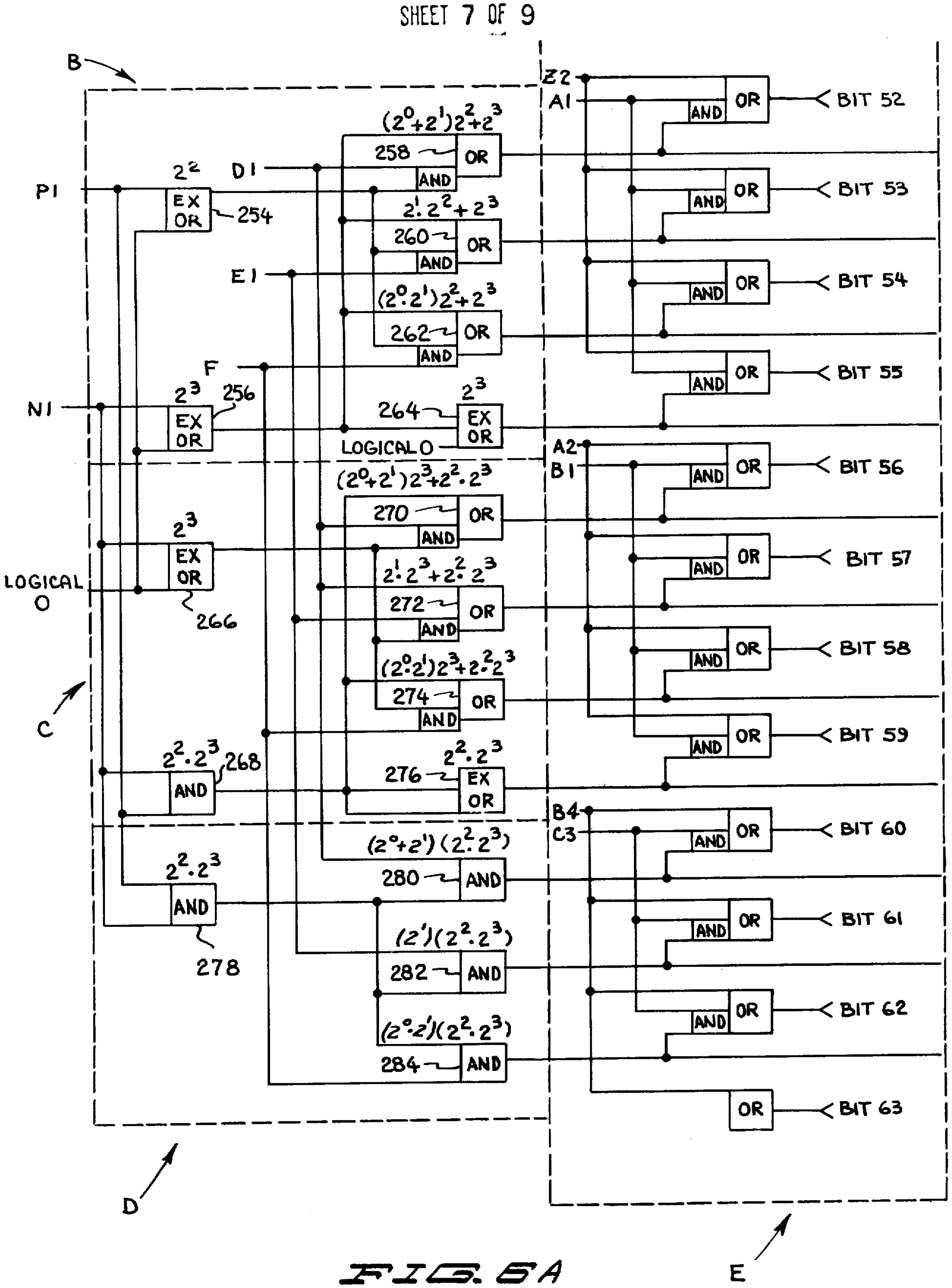
FIG. 6A is another part of the diagram partially shown in FIG. 5A.
Figure 6B:
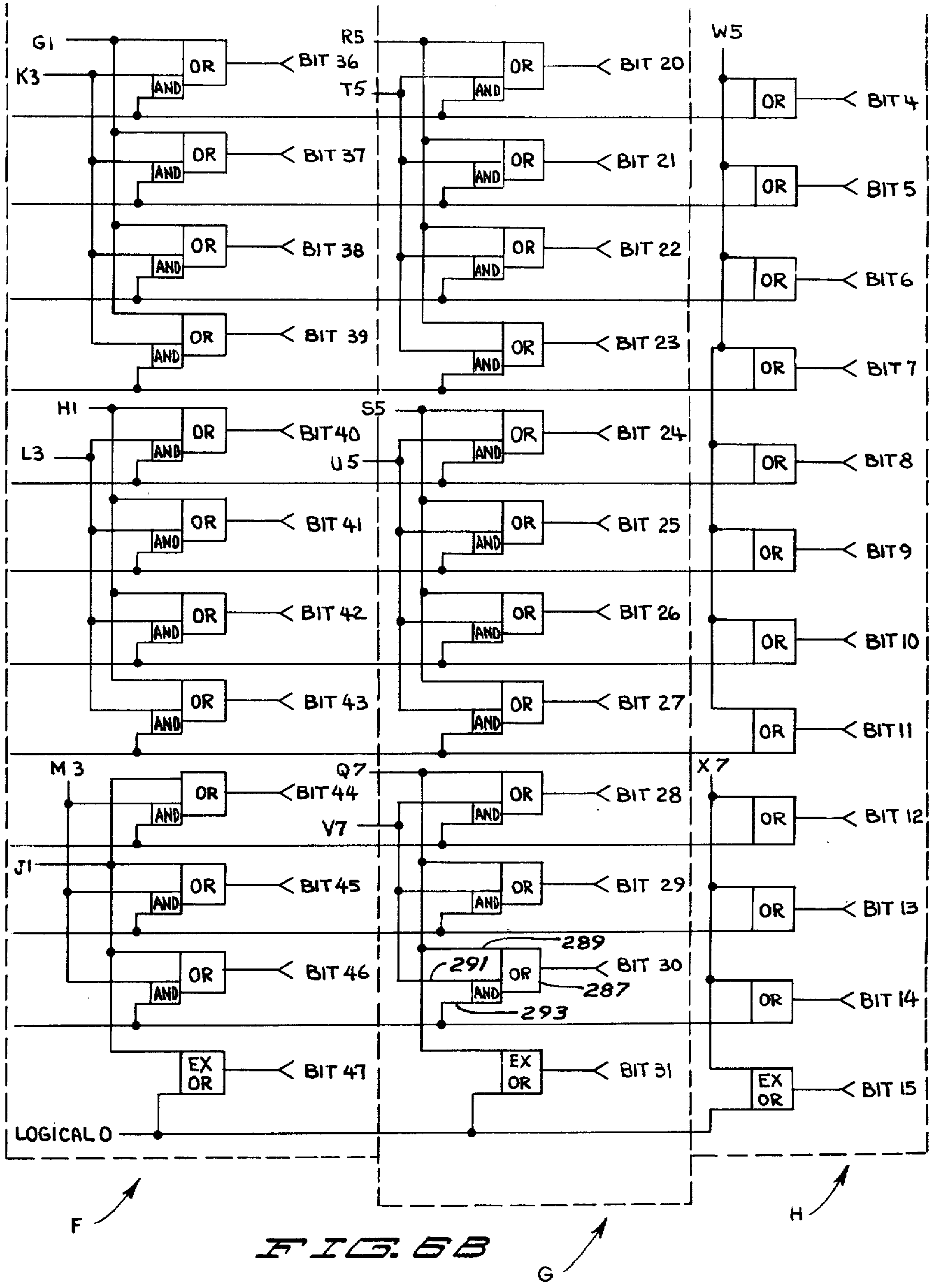
FIG. 6B is another part of the diagram partially shown in FIG. 5A.
Figure 7:
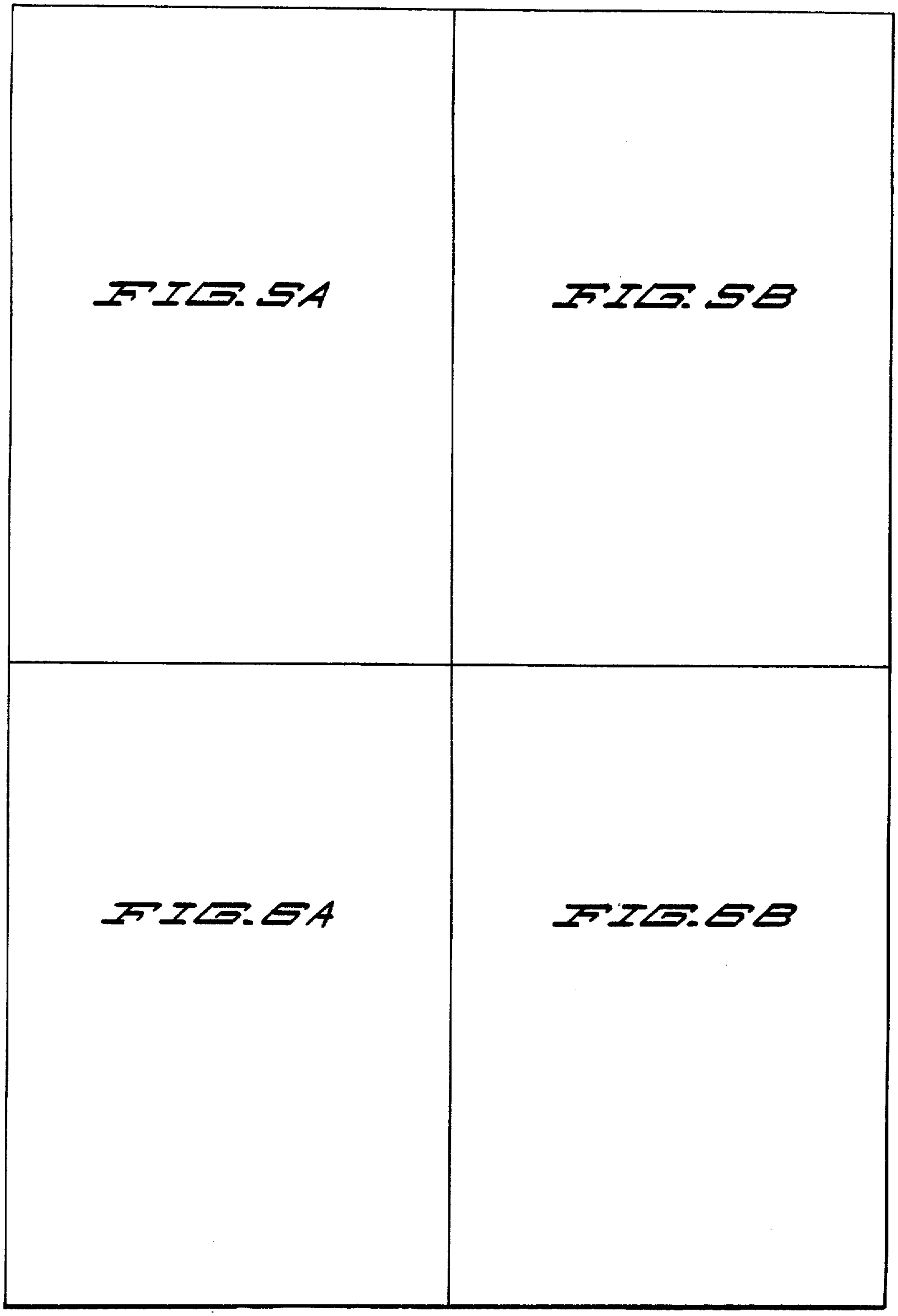
FIG. 7 is a sketch showing the proper placement of FIGS. 5A, 5B, 6A, and 6B to achieve a complete showing, with interconnections extending between drawings, of the logic elements in a implementation of a mask network.

Network 58 is a special type of partial addition network. A detailed drawing of this network is shown in FIG. 3A. The output of this network is partial sums and partial carries, labeled PS and PC on the figures.

The purposes of networks 56 and 58 is to allow production of a shift count on data transmission trunk 43 which is equal to the width of the data words A and B, which in this example is 64, minus one or both of the input counts M and N that are shown coming into registers 64 and 66. It will be seen later in the description of this network that for certain operations, a number which is equal to 64 minus either M or N or in some cases M + N is produced. Networks 56 and 58 perform this function in the embodiment of this invention that is shown. Any other network which performed this function could be used in place of networks 56 and 58.

Network 12 is a general purpose right circular shift network. A network suitable for use in this application is described in the book "Design Of A Computer — The Control Data 6600" by James E. Thornton, published in 1970 by Scott, Foresman and Company.

Figure 2:
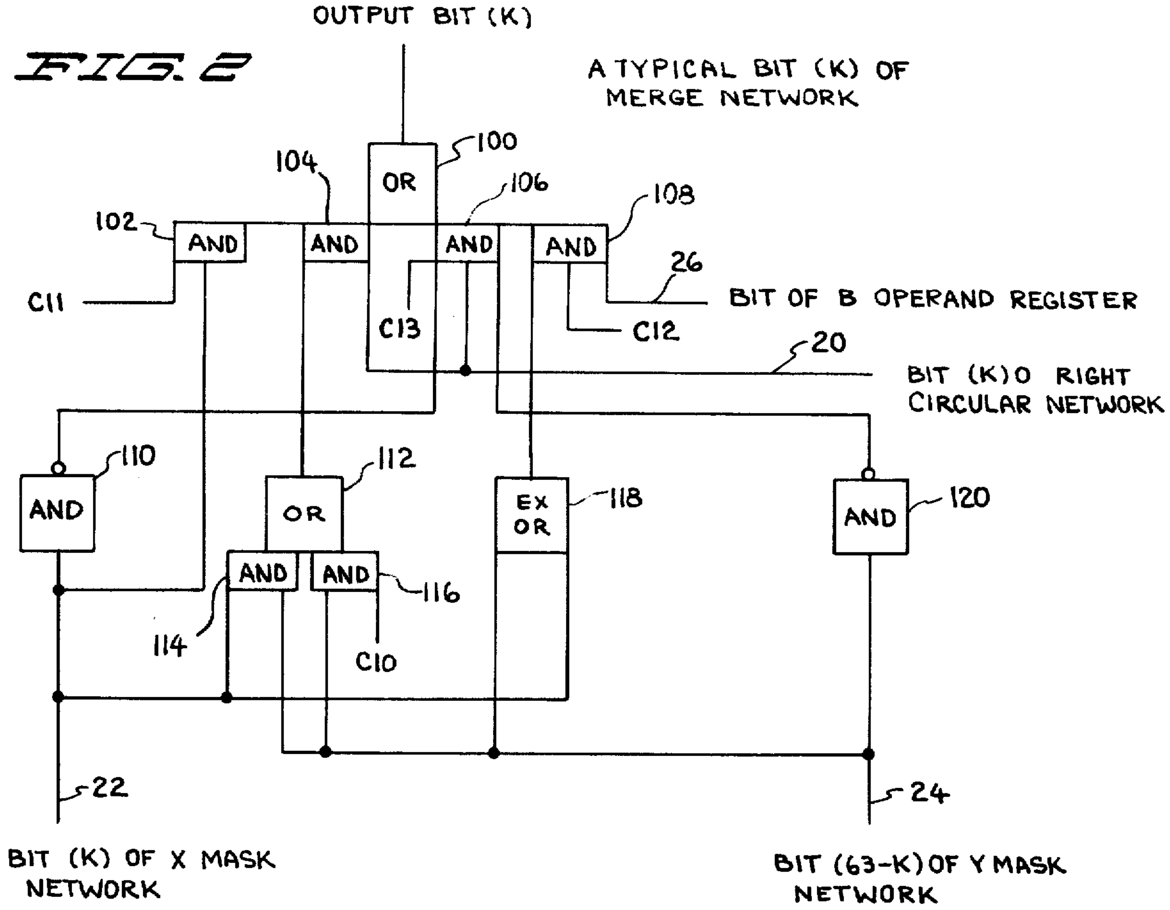
FIG. 2 is a detailed diagram showing the logic elements of the merge network represented in block 10 of FIG. 1 for a typical bit where the logic is repeated for each bit handled by the network of the present invention.

Network 10 is a merge network. FIG. 2 shows a typical bit in merge network 10. In this particular embodiment of this invention, merge network 10 is 64 bits wide. The control constants used in merge network 10 are shown in FIG. 4.

The remaining two networks in this invention are mask generation networks 14 and 16. These networks are shown in detail in FIGS. 5A, 5B, 6A and 6B. The purpose of these mask generation networks is to take an input count operand and produce an output which has a number of ones starting at the left which is equal to the input count. Given the A operand input, which is 64 bits wide, if N represents the input count, then, starting from the left-most bit the mask network will generate N ones followed by 64 − N zeros.

Referring now to FIGS. 5A, 5B, 6A and 6B, a more specific description of the mask generation network of this invention is provided applicable to either network 14 or 16. The input mask count operand is held in the input count register. The input register is comprised of input count flip-flops 200, 202, 204, 206, 208, 210 and 212 on FIGS. 5A and 5B. Flip-flop 200 holds the binary bit representing the $2^6$ value of the input count; and similarly flip-flop 202 holds $2^5$; flip-flop 204 holds $2^4$; flip-flop 206 holds $2^3$; flip-flop 208 holds $2^2$; flip-flop

210 holds $2^1$; and finally flip-flop 212 holds $2^0$. The operand inputs which are 64 bits wide in this embodiment of the invention require an input count which is no greater than $2^6$. Therefore, it can be seen that the seven input flip-flops just described are enough flip-flops to hold the largest input count necessary to control the 64 output bits from the merge network.

For example, assume that flip-flops 208 and 212 are set and that all the rest of the input flip-flops are clear. This will correspond to an input count of 5. The output of the mask generation network then will be, starting from the left, 5 bits of one's and 59 bits of zero.

Circuits 214 through 242 (even numbers only) are supplied signals from input flip-flops 200 through 204. These circuits form various logic translations and outputs from the input counts. The circuits are labeled as to function and exclusive OR circuits are labeled EX OR. In general, the description written above the circuit in boolean notation in the drawing, indicates the translation for the true output from the circuit in terms of the powers of two present in the input count operand. As an example, study circuit 224. When its outputs are a one, this will indicate that the input count contains a one for the $2^5$ bit. As another example, a one on the true output of circuit 220 indicates that the input shift count contains a one for the $2^6$ bit. Observe that the output from circuit 220 is from the NOT output as indicated by the small circle on the output line. This means that the output will be a one when the shift count does not contain the $2^6$ bit.

Flip-flop 200 is a special usage of a flip-flop. When flip-flop 200 sets, it indicates that the input count to the mask network is 64 or greater. This means that whenever flip-flop 200 sets, the mask network will generate 64 ones as output. It makes no difference what flip-flops 202 through 212 contain. Circuits 214 through 236 are supplied from the high order input count bits 200, 202, and 204.

Referring now to FIGS. 5A, 5B, 6A and 6B taken together, the circuits in the areas labeled A, B, C and D, surrounded with dashed lines, are common to all four 16-bit groups labeled E, F, G and H and surrounded with dashed lines. The individual circuits in groups E, F, G and H are in general an OR of two inputs. One of the inputs is a single signal. The other input is an AND of two signals. For example, circuit 286 in group C has as inputs signal lines 288, 290, 292. Signal line 288 is connected to the single input in the four circuits in group G associated with the most significant bit in the group. Note that signal lines 294, 296 and 298 have identical translations to that of signal line 288 and are connected to all the rest of the circuits in group G. The translation for signals on lines 288, 294, 296 and 298 is $2^5 + 2^6$.

This means that the input count operand is greater than 31, requiring that all circuits in group G should have a one output. This is the function of line 288 for circuit 286, and is the function of the single input to all the output circuits. If that single input is a one, then the output of all the circuits in the 16 bit group should be ones. If not, all the outputs within a 16 bit group are not to be a one, then the single input line, represented by line 288 on circuit 286 will not be a one. In circuit 286 the two inputs are the signals on lines 290 and 292. Signal 290 comes from circuit 234. Circuit 234 has a 1 output if the $2^4$ bit in the input count is a 1. If output 290 of circuit 234 is one, then the input must be 16 or greater. If signal 288 is a zero and signal 290 is a one, the transition between ones and zeros will appear somewhere in group G since the input count will be between 16 and 31. Line 290 then requires a possibility that any bit in group G will be a one, but in order to determine if specific outputs within the group will be a one, the lower order bits of the shift count determine where the break occurs in the output. This is the function of the circuits in the areas marked A, B, C and D. The inputs to these circuits come from input flip-flops 212, 210, 208 and 206 and are $2^0$, $2^1$, and $2^2$, and $2^3$ respectively. These are the low order bits to the input count and make the fine subdivision that determines where the break between the ones and the zeros is in the 16-bit groups.

For circuit 286, this subdivision function is performed by input 292 into the two input AND gate. Line 292 comes from circuit 246. Circuit 246 is one of a group of circuits in the area labeled A. The circuits in group A feed the upper four bits in groups E, F, G and H. The circuits in the selected groups E, F, G or H, depending on which group contains the transition from ones to zeros, determine whether the output signals should be ones or zeros.

The circuits in area A control the upper four bits of all groups, circuits in box B control the next four bits of all groups, the circuits in box C control the next four bits of all groups, the circuits in box D control the lowest four bits of all four groups. These circuits are numbered (even numbers only) circuits 238 through 284.

Circuit 246 has output 292 to indicate that one or more of the bits representing $2^0$ or $2^1$ or $2^2$ or $2^3$ in the input count are set to one. This indicates that the least significant 4 bits of input count translate to a number which is greater than or equal to one. Assume that signal line 288 carries a zero and signal line 290 carries a one. This indicates that the input count was between 16 and 31. If the lowest four bits of the count translate to a number greater than or equal to one, then the input count must be 17 or larger. This is a sufficient condition for a one output from circuit 286. The translation for circuit 248 is that the lower four bits of the input count translate to a number which is 2 or larger. The output from circuit 250 indicates that the lowest 4 bits of the input count translate to a number which is 3 or larger. This pattern continues until logic block 284 indicates that all the lower four bits of the input count are ones. This implies that the lower four bits of the count translate to a 15. Again, assuming that input lines 289 and 291 are such that the input count is between 16 and 31 (line 289=0 and line 291=1), and if output line 293 of circuit 284 carries a one, then the input count is 31. This is a sufficient condition to have a 1 output from circuit 287.

From the above discussion it should be obvious to one skilled in the art how to construct a generalized masking network as well as to understand how the present network is designed by inspection of the figures. If the output of the mask network is to be N bits wide, the N bits should be broken into M groups of convenient width. A translation for each group should be formed off the high order input count bits that indicate, for that group, whether the output of all bits in the group should be a one. Call this type of term Q. Another translation for each group should be formed off the high order input count bits that indicates, for that group whether a transition between one output bits and zero output bits occurs in the group. Call this type of term R.

A translation for each bit within a group should be formed from the lower order bits of the input count which indicates whether a bit will be a one if the transition between one outputs and zero outputs occurs within the group. Call this type of term S. S type terms can normally be shared between groups. A general output term T for a typical bit can then be expressed as:

$$T = Q + RS$$

The exact boolean translations for Q, R and S will vary with N and with the chosen group width and structure. It is generally convenient to choose the groups to be $2^P$ bits wide when P is an integer chosen to be convenient for the logic involved. This is not an absolute necessity. The groups need not all be of the same width. The embodiment of this invention described herein should make the development of the Q, R and S terms obvious to one skilled in the art. For some output terms, the boolean logic degenerates to allow a simpler logic implemention of the boolean expression.

Referring again to FIG. 1, mask networks 14 and 16 operate to provide transfer or no transfer conditions to each bit in merge network 10. Networks 14 and 16 are identical networks.

However, the outputs from network 16 are wired to network 10 in reverse fashion with respect to all other operand inputs to network 10 as indicated by the legend on FIG. 1. In other words bit 0 of network 16 is wired to bit 63 of network 10 and so on through to bit 63 of network 16 which is wired to bit zero of network 10. Network 14 produces a masking pattern of ones beginning from the left and proceeding to the right. The number of ones on signal line 22 will correspond to the count in register 30. Network 16 produces a masking pattern of ones that starts from the right and proceeds to the left. The number of ones will correspond to the count in register 32.

In general, boolean logic functions of thses two patterns will have three distinct areas. There is an area on the left-hand side of this logical combination where the bits of masking network 14 are ones and the bits of masking network 16 are zeros. There is an area in the center of the logical result of the outputs of masking network 14 and 16 where the bits of both of their outputs are ones. There is an area to the right-hand side of the logical combination of the outputs of networks 14 and 16 where the outputs of network 14 are zeros and the outputs of network 16 are ones. Referring now to FIG. 2, which is the detailed drawing of merge network 10, AND gate 114 produces the AND of the two masking networks 14 and 16 and is a one for the bits in the center region, previously described where the outputs of both masking networks are ones.

In operation the present invention can accomplish six different operations in a pipeline fashion. FIG. 4 lists these operations and indicates the value for each operation of all of the control constants or signals used in the networks making up the invention. For example, consider a right circular shift of operand A by M places. Referring to FIGS. 1 and 4, shift count operand M flows into register 64. The contents of register 64 flow to two's complement adder 52. In selection network 54, control constant C14 is a zero. Therefore, the second input to the two's complement adder 52 is a zero and the output of two's complement adder 52 will be the shift count M. This shift count is transferred to selection network 42. Control constant CO3 is a one and CO4 is a zero. This enables the shift count to move through selection network 42 to holding register 28. Holding register 28 contains the right shift count for right circular shift network 12. Operand A is gated to the right circular shift register 12 from the register 36. Operand A is then right shifted in a circular manner by M places in right circular shift register 12. The right shifted operand appears on transmission path 20 and is gated to merge network 10. Control constant C13 is a one which opens a direct transmission path to the output of merge network 10. Control constant C12 is a zero, and therefore AND gate 108 is not enabled. Control constant C6 is a zero. This means that the output of selection network 44 is a zero. This will gate an all zero operand into holding register 30; a zero operand in register 30 will produce an all zero output from mask network 14. This will means that all bits on transmission path 22 are a zero. This will turn off AND gate 102 and will enable one of the inputs to AND gate 106. Control constants C7 and C8 are both zeros. This will cause a zero output from selection network 50 and enter a zero into holding register 32. A zero in holding register 32 will produce an all zero output from mask network 16 and produce all zeros on transmission trunk 24. All zeros on the transmission trunk will cause AND gate 120 to be a zero and cause its NOT output to be a one. This will enable the fourth input to AND gate 106 as shown in FIG. 2. AND gates 114 and 110 on FIG. 2 will be a zero because transmission trunks 22 and 24 contain zeros. This will cause OR gate 112 and thus AND gate 104 to have a zero output. In the merge network shown in FIG. 2, AND gate 102 will be a zero, AND gate 104 will be a zero, AND gate 106 will contain the desired information and finally, AND gate 108 will be turned off.

The rest of the shift operations are similar to the right circular shift. Mask network 14 generates a masking pattern for sign extension when the network performs right shifting, with sign extension. Mask network 16 generates a masking pattern for the left shift with zero extension. One skilled in the art should have not trouble seeing how these operations work using FIGS. 1, 2, 3A through 3G, and 4.

The insert operation involves taking the right most M bits out of operand A and inserting them into operand B beginning at bit position N. Count M will reside in register 64 and will be gated to two's complement adder 52. Count N will reside in register 64 and will flow through selection network 54 to the other input of two's complement adder 52. Control constant C14 is a one. The output of two's complement adder 52 will then be the number M + N. This number will be gated through selection network 42 to holding register 28. Control constant C3 is a one. Holding register 28 will then contain the sum M + N. Right circular shift network 12 will then shift operand A right circular by M + N places. The output of two's complement adder 52 will also be gated through selection network 44 to holding register 30. Control constant C6 is a one. Holding register 30 is the input to mask network 14. Mask network 14 will produce M + N ones beginning from the left and proceeding to the right. Count N will be gated through selection network 62 to network 58. Zeros will be gated to the other input of partial adder network 58 because control constant CO1 is a zero. Note that control constant CO2 is a one. The output of two's complement adder 56 then will be 64 minus N. Networks 56 and 58 combine to produce 64 minus the sum of the two numbers gated through selection networks 60 and 62. Control constant CO7 is a one, and therefore, the output of two's complement adder 56 will be gated to holding register 32. Holding register 32 will now contain 64 minus N. Masking network 16 will produce 64 minus N ones beginning at the right and proceeding toward the left.

Referring now to FIG. 2, remembering that register 18 contains operand B with control constant C10 set to zero, the output of AND gate 114 and OR gate 112 will be the AND of the masking patterns appearing on trunks 22 and 24. The output from right circular shift network 12 will transfer on data trunk 20 to AND gate 104 in the bit positions where data trunk 22 and 24 are both ones. AND gate 102 will have a zero output because control constant C11 is a zero. Control constant 12 is a one. The output of exclusive OR gate 118 will be a one wherever input trunks 22 and 24 are not equal. This will enable AND gate 108 and allow bits of operand B to flow into AND gate 108 through data trunk 26 whenever masking patters on the NOT of data trunks 22 and 24 differ. AND gate 106 will be a zero because data transmission trunk 22 and 24 both are entered into this AND gate. In order for this particular AND gate to be made, data trunk 22 and 24 both need to be zeros. This cannot occur for the operation being performed. The output of merge network 10 or of the network whose typical bit is shown in FIG. 2 will be the desired result of the insert operation.

Reviewing, the number that is to be inserted is right shifted M+N places in a circular fashion. It is desired to take a group of bits that is M bits wide and insert it into another number beginning at position bit N. A shift of M will take the right-most bit of the portion that is to be inserted and move it around to the left end of a 64 bit number. An additional right shift of N places will move the portion of A that is to be inserted into B down to the position in B where it is to be inserted. This then was the function of the right circular shift of M+N places. This operation occurred in network 12 on operand A. A careful analysis of the masking patterns generated in networks 14 and 16 will reveal that the logical AND of these two masking patterns is a one in the position where bits are inserted from operand A into B, and that the logical exclusive OR of the output of these two networks is a one where bits of B are retained. Merge network 10 was simply a realization of this boolean logic on a bit by bit basis. One skilled in the art can reasonable see how the extract operation and other operations similar to the insert and extract operation are performed in this network in a manner very similar to the insert operation. A significant point in understanding operations involving two input operands is that the operations are based on coincidence in the merge network of two masking patterns.

The invention just described is a pipeline which can accept new input numbers every machine timing cycle. This is true because operand counts M and N are held in registers 64 and 66 for only one cycle. During the next cycle of operation, the result of whatever operations done on these two counts will be held in holding registers 28 or 30 or 32, and a new M and N can be accepted for the next operation. These operands will again reside in registers 64 and 66 for one machine cycle. The same is true of the operands A and B. They will reside in registers 36 and 18 for only one machine cycle. These operands are needed for only one cycle and then a new set of input operands can be accepted into registers 36 and 18. It should be noted that when this network as a pipeline the trunks for operands A and B are one time period shorter than the trunks for the count operands M and N. In other words, the operands M and N that correspond to a given pair of operands A and B would have to be presented to this network one cycle earlier than would the operands A and B. This is a minor problem. If one has difficulty in a particular embodiment of this invention is presenting A and B one time period early, the solution is very simple. One simply adds another holding register in operand A path and another one in the operand B path. If this were done, then operand A and B could be presented to the network at the same time as counts M and N are presented. In the normal operation of this invention, it will be convenient to present operand counts M and N to the network one cycle earlier than operands A and B because quite often the operands are being read from a device which will have a limited capacity to produce operands. It may be very convenient to read operands A and B one cycle later than M and N.

One additional point should be made with respect to the mask networks. The method in which these networks are derived allows the derivation of networks that are wider or narrower than the one described. The present network breaks down into four 16-bit groups. If one were to want to build a masking network that is 128 bits wide, then one acceptable method is to break that 128 bit number down into, not four 16-bit groups, but eight 16bit groups. One skilled in the art will see then that the technology described here is sufficient for working with wider numbers. There would simply be more network groups like the group 214 through 236. These are the groups which identify which 16-bit group has the break between the ones and zeros. More groups like this are provided and then the groups in the areas A, B, C and D would extend to a given bit in all the groups. So a term like 246, rather than feeding only 4 bits, would extend to 8 bits or the left most bit in each of the 16-bit groups for a 128 bit operand.

In addition, additional mask networks could be provided for connection with a merge network designed on the same principles as herein disclosed for producing more complicated functions of a type related to those performed by the present apparatus. Such mask networks may be used to identify additional zones in the merge network for insert or extract operations with additional operands for example.

What is claimed is:

1. A binary data manipulation network for performing a preselected function from a group of predetermined functions, comprising:

a merge network which produces an output operand, said merge network being responsive to predetermined control signals dependent on the preselected function to be performed, a shift network connected with said merge network for altering the bit position of the bits in an operand, said shift network producing an output operand which constitutes a first input to said merge network., means for providing as an input to said shift network a first data operand, a first mask network connected with said merge network, producing an output masking pattern, which constitutes a second input to said merge network, in response to a first input count operand, a first means for providing an input count operand, as an input to said first mask network, a second mask network connected with said merge network, producing an output masking pattern which constitutes a third input to said merge network, in response to a second input count operand, a second means for providing an input count operand as an input to said second mask network, and means for providing as a fourth input to said merge network second data operand.

2. The apparatus of claim 1 and means for providing predetermined control signals to said merge network dependent on the preselected function to be performed.

3. The apparatus of claim 1 and further comprising as said first and second means for providing an input count operand;

a first means for receiving a first preselected input count operand, a second means for receiving a second preselected input count operand, a first means for adding connected to said first and second means for receiving and having an output, a first selection network means connected with said first means for receiving, said network being responsive to predetermined control signals dependent on the preselected function to be performed, a second selection network means connected with said second means for receiving, said network being responsive to predetermined control signals dependent on the preselected function to be performed, a second means for adding connected with first and second selection networks and having an output, and third, fourth, and fifth selection networks, each of said networks having two imputs, one of which is connected with the output of said first means for adding and the other of which is connected with the output of said second means for adding, each of said networks being responsive to predetermined control signals dependent on the preselected function to be performed, said third selection network having an output connected to said shift network to provide a shift count operand thereto, said fourth selection network having an output connected to said first mask network to provide said input count operand, and said fifth selection network having an output connected to said second mask network to provide said input count operand.

4. The apparatus of claim 3 and means for providing predetermined control signals to said first, second, third, fourth and fifth selection networks dependent on the preselected function to be performed.

5. The apparatus of claim 3 wherein said shift network is a right circular shift network.

6. The apparatus of claim 3 wherein each mask network is comprised of:

an input register for receiving and holding an input mask count operand, a plurality of networks of a first type connected with said input register which determine where and in which group of a plurality of groups into which the output mask operand is divided contains the break point between operand bits of different types, and a plurality of networks of a second type connected with said input register which determine which groups of a plurality of groups into which the output mask operand is divided contain operand bits of a predetermined type all of which are alike.

7. The apparatus of claim 1 wherein said shift network is a right circular shift network.

8. The apparatus of claim 1 wherein each mask network is comprised of:

an input register for receiving and holding an input mask count operand, a plurality of networks of a first type connected with said input register which determine where and in which group of a plurality of groups into which the output mask operand is divided contains the break point between operand bits of different types, and a plurality of networks of a second type connected with said input register which determine which groups of a plurality of groups into which the output mask operand is divided contain operand bits of a predetermined type all of which are alike.

9. A binary data manipulation network for performing a preselected function from a group of predetermined functions, comprising a merge network which produces an output operand, said merge network being responsive to predetermined control signals dependent on a preselected function to be performed, at least one shift network connected with said merge network for altering the bit position of the bits in an operand, said shift network producing an output operand which constitutes a first input to said merge network, means for providing as an input to said shift network a first data operand, a plurality of mask networks connected with said merge network, each producing an output masking pattern, each of which constitutes an input to said merge network, in response to an independent input count operand provided to each of said networks, means for providing input count operands to each of said mask networks, means for providing at least one additional data operand as an input to said merge network.

* * * * *